US012442953B2

(12) United States Patent
Jones

(10) Patent No.: US 12,442,953 B2
(45) Date of Patent: Oct. 14, 2025

(54) OPTICAL LENS

(71) Applicant: Apple Inc., Cupertino, CA (US)

(72) Inventor: Christopher D. Jones, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 629 days.

(21) Appl. No.: 17/817,351

(22) Filed: Aug. 3, 2022

(65) Prior Publication Data
US 2023/0100047 A1 Mar. 30, 2023

Related U.S. Application Data

(60) Provisional application No. 63/261,410, filed on Sep. 20, 2021.

(51) Int. Cl.
G02B 1/02 (2006.01)
G02B 3/00 (2006.01)

(52) U.S. Cl.
CPC . *G02B 1/02* (2013.01); *G02B 3/00* (2013.01)

(58) Field of Classification Search
CPC . G02B 7/00; G02B 7/027; G02B 1/00; G02B 1/002; G02B 1/02; G02B 1/04; G02B 3/00; G02B 3/0012; G02B 3/0062
See application file for complete search history.

(56) References Cited

U.S. PATENT DOCUMENTS

| | | | | |
|---|---|---|---|---|
| 2013/0034689 A1* | 2/2013 | Hunt | | B32B 27/08 428/688 |
| 2016/0163760 A1* | 6/2016 | Tsai | | H10F 39/182 438/70 |
| 2018/0014781 A1* | 1/2018 | Clavelle | | A61B 5/681 |
| 2020/0389991 A1* | 12/2020 | Shannon | | C03C 15/00 |
| 2021/0057611 A1* | 2/2021 | Guo | | H10H 20/83 |
| 2021/0068688 A1* | 3/2021 | Spencer | | G06F 1/1684 |
| 2021/0080680 A1* | 3/2021 | Maric | | G02B 27/0176 |
| 2021/0286201 A1* | 9/2021 | Ma | | G02F 1/29 |

FOREIGN PATENT DOCUMENTS

| | | |
|---|---|---|
| CN | 107924045 A | 4/2018 |
| CN | 112420890 A | 2/2021 |
| CN | 112578486 A | 3/2021 |
| CN | 112578526 A | 3/2021 |

* cited by examiner

*Primary Examiner* — Sultan Chowdhury
(74) *Attorney, Agent, or Firm* — Dorsey & Whitney LLP

(57) ABSTRACT

An optical lens includes a first transparent portion, a second transparent portion, and an opaque metal barrier separating the first transparent portion from the second transparent portion. The opaque metal barrier is bonded directly to the first transparent portion and the second transparent portion via aluminum-oxide bonds. The optical lens can include a transition zone between the opaque metal barrier and adjacent transparent portions. The transition zone can include the aluminum-oxide bonds and have a thickness.

19 Claims, 11 Drawing Sheets

OPTICAL LENS

CROSS-REFERENCE TO RELATED APPLICATION

This application claims the benefit of U.S. Provisional Patent Application No. 63/261,410, filed 20 Sep. 2021, entitled "OPTICAL LENS," the disclosure of which is incorporated herein by reference in its entirety.

FIELD

The described examples relate generally to electronic devices. More particularly, the present examples relate to electronic devices including input components and output components.

BACKGROUND

As portable electronic devices continue to include increasingly greater numbers of features, integration of those features into a single device becomes ever more complex. For example, certain features can require both the emission of light from the electronic device, and the detection of light from the ambient environment. Components designed to emit light from the device can, however, also undesirably emit light that travels along a pathway incident on a light detector without ever reaching an ambient environment outside the device. These undesirable light pathways can cause false positives or undesirable amounts of noise when attempting to detect light from outside the device. In addition, as the functionality of portable electronic devices increases, it becomes necessary to arrange the increased functional components in more compact ways to maintain small form factors desired by consumers. Accordingly, it is desirable to provide components, such as a device enclosure, that can provide emitter and detector components with a desired level of optical isolation without undesirably increasing the size of the device.

SUMMARY

According to some aspects of the present disclosure, an optical lens includes a first transparent portion, a second transparent portion, and an opaque metal barrier separating the first transparent portion from the second transparent portion. The opaque metal barrier is bonded directly to the first transparent portion and the second transparent portion via aluminum-oxide bonds.

In one example, the optical lens defines a first surface and a second surface opposite the first surface, and the opaque metal barrier extends from the first surface to the second surface. In one example, the first surface is defined by an outer surface of the first transparent portion, an outer surface of the second transparent portion, and an outer surface of the opaque metal barrier, the outer surfaces of the first and second transparent portions being flush with the outer surface of the opaque metal barrier. In one example, a thickness of the opaque metal barrier is between about 200 nm and about 100 μm. In one example, the opaque metal barrier includes aluminum. In one example, the first transparent portion and the second transparent portion can include a ceramic. In one example, the first transparent portion and the second transparent portion can include sapphire.

In one example, the optical lens can also include a transition zone between the opaque metal barrier and the first transparent portion, the transition zone having the Al—O bonds. In on example, a thickness of the transition zone is at least about 50 nm. In one example, a thickness of the transition zone is at least about 100 nm. In on example, a thickness of the opaque metal barrier is at least twice the thickness of the transition zone.

According to some aspects of the present disclosure, an optical component includes a metal optical isolator bonded directly to a first ceramic transparent substrate and a transition zone defining a boundary between the optical isolator and the first ceramic transparent substrate, the boundary having a thickness. In one example, the thickness is between about 50 nm and about 200 nm. In one example, the transition zone is amorphous. In one example, the transition zone is crystalline.

According to some aspects of the present disclosure, an optical lens disposed within an aperture of an electronic device can include a first transparent portion, a second transparent portion, and an opaque metal portion disposed between and bonded directly to the first transparent portion and the second transparent portion. A thickness of the opaque metal portion is less than about 200 μm.

In one example, the thickness is less than about 100 μm. In one example, the thickness is between about 50 μm and about 100 μm. In one example, the optical lens includes an amorphous transition zone between the opaque metal portion and the first transparent portion, the transition zone including Al—O bonds. In one example, the optical lens includes a crystalline transition zone between the opaque metal portion and the first transparent portion, the transition zone including Al—O bonds.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
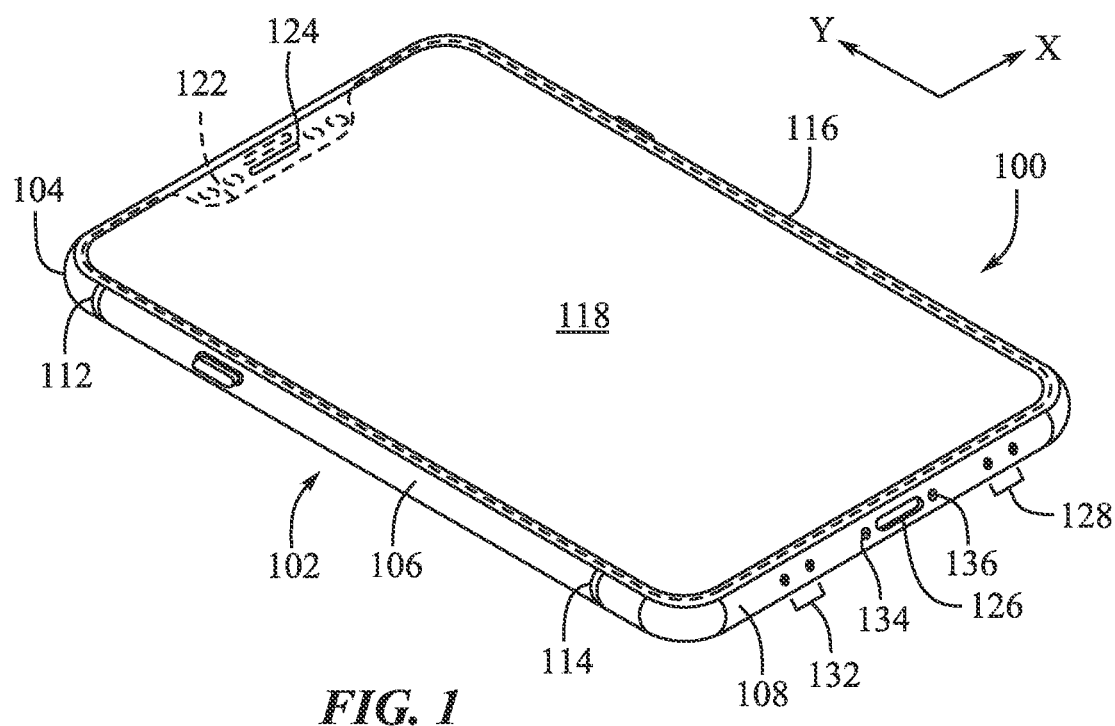
FIG. 1 shows a top perspective view of an example of an electronic device.

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples, as defined by the appended claims.

One aspect of the present disclosure relates to an optical lens that includes a first transparent portion, a second transparent portion, and an opaque metal barrier separating the first transparent portion from the second transparent portion. The opaque metal barrier is bonded directly to the first transparent portion and the second transparent portion via aluminum-oxide bonds.

Electronic devices increasingly include components that can detect or otherwise receive information based on the ambient environment outside the electronic device. For example, smartphones typically include visible light detectors, such as cameras, that can receive light from the ambient environment which is then processed into an image that is displayed to a user. In addition to components used for detecting properties of the ambient environment, such as light, electronic devices also increasingly include components that can transmit or emit signals or information into the ambient environment. Returning to the example of a smartphone including a visible light detector in the form of a camera, such a device can also include a light emitter in the form of a light emitting diode flash component. Such an emitting component can work together with a detector to enhance the amount of information detected from the ambient environment. For example, if the electronic device is in an environment that does not contain enough visible light to produce a significant signal on the light detector of the camera, the flash component can be triggered to emit light to illuminate the ambient environment and allow the detector to receive information appropriate to produce an image.

The packaging of both emitters and detectors in a single electronic device, especially emitters and detectors that can operate in the same range of wavelengths of electromagnetic radiation or light, can sometimes lead to the generation of false signals. In the example of a camera, it is desirable that the camera only detect light, and thus generate a signal, from a desired location in the ambient environment. If the device also includes an emitter in the form of a flash, however, the concurrent use of the emitter and the camera can result in a false signal, if the camera is not optically isolated from the flash. That is, if the flash emits light that travels to the detector through a pathway that is entirely inside the device, the light incident on the detector will not be entirely from the ambient environment, and thus, will not be an accurate depiction of that environment. This condition is also referred to as light leakage or cross-talk. Accordingly, it can be desirable for emitters that emit electromagnetic radiation detectable by a detector and that are internally optically isolated from those detectors.

In addition to camera and flash systems, other electronic device systems can include electromagnetic radiation emitters and detectors. For example, an electronic device can include a vision system designed to assist in providing recognition of an object, or objects. In some instances, the vision system is designed to provide facial recognition of a face of a user of the electronic device. The vision system can include a camera module designed to capture an image, such as a two-dimensional image. The vision system can further include a light emitting module designed to emit several light rays toward the object. The light rays can project a dot pattern onto the object. Further, the light emitting module can emit light in the frequency spectrum of invisible light, such as infrared light (or IR light). The vision system can further include an additional camera module designed to receive at least some of the light rays reflected from the object, and as a result, receive the dot pattern subsequent to the light rays being reflected by the object. The additional camera module can include a light filter designed to filter out light that is not within the frequency spectrum of light emitted from the light emitting module. As an example, the light filter can include an IR light filter designed to block light that is outside the frequency range for IR light. The additional camera module can provide the dot pattern (or a two-dimensional image of the dot pattern) to a processor in the electronic device.

Other exemplary emitter and detector systems that operate in the same or similar ranges of wavelengths of light can include biometric detection systems. These systems can include components that can emit light and project the light onto a user's body, whereupon the emitted light can be at least partially reflected back from the user's body back toward a detector of the device. As the properties of the emitted light are known and controlled by the emitter, the differences between the properties of the light emitted onto the body and the light reflected therefrom and received by the detector can be used to determine a number of biometric or biological properties of the user's body, such as a user's pulse, heart activity, and/or other similar biometric properties.

These and other assemblies or systems including emitters and detectors can include an opaque structural element inside the device that can serve to enclose and optically isolate the emitter components from the detector components. These structural elements typically take the form of walls or chambers that can optically isolate the components in a lateral direction. By their nature, however, the emitters and detectors must have a pathway to emit light to, or receive light from the ambient environment. Accordingly, transparent coverings such as lenses or glasses are typically used to cover the emitters and detectors, and to provide a window to the ambient environment.

Further, it can be desirable for the emitters and detectors of these systems to be disposed relatively near or adjacent to one another, for example, to increase the accuracy or sensitivity of the system. As such, a single lens or transparent cover can be used to provide a light path to the ambient environment for both the emitters and detectors. Even when optically isolated within the housing, such as by an opaque structural element, a light leakage pathway between emitters and detectors can exist through the lens or cover. For example, where a system both emits and receives light with the ambient environment through a single light or cover, some light from the emitter can be internally reflected within a shared lens or cover to reach a detector without first interacting with the ambient environment. As described above, this can result in cross-talk or false signals, and can undesirably impact the performance of the device.

The risk and instances of undesirable cross-talk and false signals increases with a greater number of emitters and detectors arranged in a small space. Recent advances in portable electronic devices can include three, four, five, or even more emitters and detectors, arranged in a device as small as a standard wristwatch, for example within smartwatches. The various functions described above, which require emitters and detectors, can be disposed within a device and behind a single, unitary lens with opaque optical isolation features that eliminate or minimize cross-talk and false signals discussed above. In particular, the optical isolation features of optical lenses disclosed herein provide thin, effective optical isolation within lenses, which allows for an increased number of emitters and detectors to be disposed in a compact configuration behind a single lens without negatively impacting functionality.

In addition to minimizing cross-talk and false signals through undesirable pathways in the lens, the opaque optical barriers of the present disclosure maximize reflectance of light passing through the transparent portions of a lens and minimize absorption of the light into the opaque portions. In one example, this is accomplished by providing opaque optical isolation features and regions that bond directly to adjacent transparent portions of a lens or optical cover. In this way, no intermediate bonding or adhesive layers disposed between opaque and transparent portions are present to absorb light. Rather, the opaque portions are made of metal materials with high reflectivity and low absorption properties bonded directly to adjacent transparent portions. Thus, light traveling through the transparent portions may reflect off adjacent opaque portions without being absorbed thereby.

A unitary optical component, as described herein, including one or more transparent portions and one or more opaque portions disposed there between, can act as a lens or cover for the emitters and detectors of a system, without providing any undesirable light pathways, thereby reducing or eliminating any light leakage or cross-talk between emitters and detectors while further optically isolating these components. In addition, as noted above, the optical isolation features disclosed herein maximize light transmission through transparent portions of a lens by not only minimizing transmission through the opaque portions but also by minimizing absorption and maximizing reflectance such that light emitted by emitters and received by detectors is not lost to the opaque portions. Furthermore, the unitary optical component serves as a water-resistant barrier, preventing the ingress of moisture to the emitters and detectors.

These and other examples are discussed below with reference to FIGS. 1-15. However, those skilled in the art will readily appreciate that the detailed description given herein with respect to these Figures is for explanatory purposes only, and should not be construed as limiting.

FIG. 1 illustrates a perspective view of an example of an electronic device 100. The electronic device 100 shown in FIG. 1 is a mobile wireless communication device, such as a smartphone. The smartphone of FIG. 1 is merely one representative example of a device that can be used in conjunction with the systems and methods disclosed herein. Electronic device 100 can correspond to any form of wearable electronic device, a portable media player, a media storage device, a portable digital assistant ("PDA"), a tablet computer, a computer, a mobile communication device, a GPS unit, a remote-control device, or any other electronic device. The electronic device 100 can be referred to as an electronic device, or a consumer device.

The electronic device 100 can have a housing that includes a frame or a band 102 that defines an outer perimeter and a portion of the exterior surface of the electronic device 100. The band 102, or portions thereof, can be joined to one or more other components of the device as described herein. In some examples, the band 102 can include several sidewall components, such as a first sidewall component 104, a second sidewall component 106, a third sidewall component 108 (opposite the first sidewall component 104), and a fourth sidewall component (not shown in FIG. 1). The sidewall components can be joined, for example, at multiple locations, to one or more other components of the device, as described herein.

In some instances, some of the sidewall components form part of an antenna assembly (not shown in FIG. 1). As a result, a non-metal material or materials can separate the sidewall components of the band 102 from each other, in order to electrically isolate the sidewall components. For example, a first separating material 112 separates the first sidewall component 104 from the second sidewall component 106, and a second separating material 114 separates the second sidewall component 106 from the third sidewall component 108. The aforementioned materials can include an electrically inert or insulating material(s), such as plastics and/or resin, as non-limiting examples. Further, as described herein, one or more of the sidewall components can be electrically connected to internal components of the electronic device, such as a support plate, as described herein. In some examples, these electrical connections can be achieved by joining a sidewall component to an internal component, for example, as part of the antenna assembly.

The electronic device 100 can further include a display assembly 116 (shown as a dotted line) that is covered by a protective cover 118. The display assembly 116 can include multiple layers (discussed below), with each layer providing a unique function. The display assembly 116 can be partially covered by a border or a frame that extends along an outer edge of the protective cover 118 and partially covers an outer edge of the display assembly 116. The border can be positioned to hide or obscure any electrical and/or mechanical connections between the layers of the display assembly 116 and flexible circuit connectors. Also, the border can include a uniform thickness. For example, the border can include a thickness that generally does not change in the X- and Y-dimensions.

Also, as shown in FIG. 1, the display assembly 116 can include a notch 122, representing an absence of the display assembly 116. The notch 122 can allow for a vision system that provides the electronic device 100 with information for object recognition, such as facial recognition. In this regard, the electronic device 100 can include a masking layer with openings (shown as dotted lines) designed to hide or obscure the vision system, while the openings allow the vision system to provide object recognition information. The protective cover 118 can be formed from a transparent material, such as a ceramic including sapphire, glass, plastic, or the like. In this regard, the protective cover 118 can be referred to as a transparent cover, a transparent protective cover, or a cover glass (even though the protective cover 118 sometimes does not include glass material). Further, in some examples, the protective cover 118 can include some or all of the features of the unitary optical components described herein. In some examples, the protective cover 118 can include one or more transparent portions overlying an emitter and/or detector, for example, as associated with the vision system, and can also include one or more opaque portions extending the thickness of the cover 118 and disposed between the transparent portions, as described herein.

As shown in FIG. 1, the protective cover 118 includes an opening 124, which can represent a single opening of the protective cover 118. The opening 124 can allow for transmission of acoustical energy (in the form of audible sound) into the electronic device 100, which can be received by a microphone (not shown in FIG. 1) of the electronic device 100. The opening 124 can also, or alternatively, allow for transmission of acoustical energy (in the form of audible sound) out of the electronic device 100, which can be generated by an audio module (not shown in FIG. 1) of the electronic device 100.

The electronic device 100 can further include a port 126 designed to receive a connector of a cable assembly. The port 126 allows the electronic device 100 to communicate data (send and receive), and also allows the electronic device 100 to receive electrical energy to charge a battery assembly. Accordingly, the port 126 can include terminals that electrically couple to the connector.

Also, the electronic device 100 can include several additional openings. For example, the electronic device 100 can include openings 128 that allow an additional audio module (not shown in FIG. 1) of the electronic device to emit acoustical energy out of the electronic device 100. The electronic device 100 can further include openings 132 that allow an additional microphone of the electronic device to receive acoustical energy. Furthermore, the electronic device 100 can include a first fastener 134 and a second fastener 136 designed to securely engage with a rail that is coupled to the protective cover 118. In this regard, the first fastener 134 and the second fastener 136 are designed to couple the protective cover 118 with the band 102.

Figure 2:
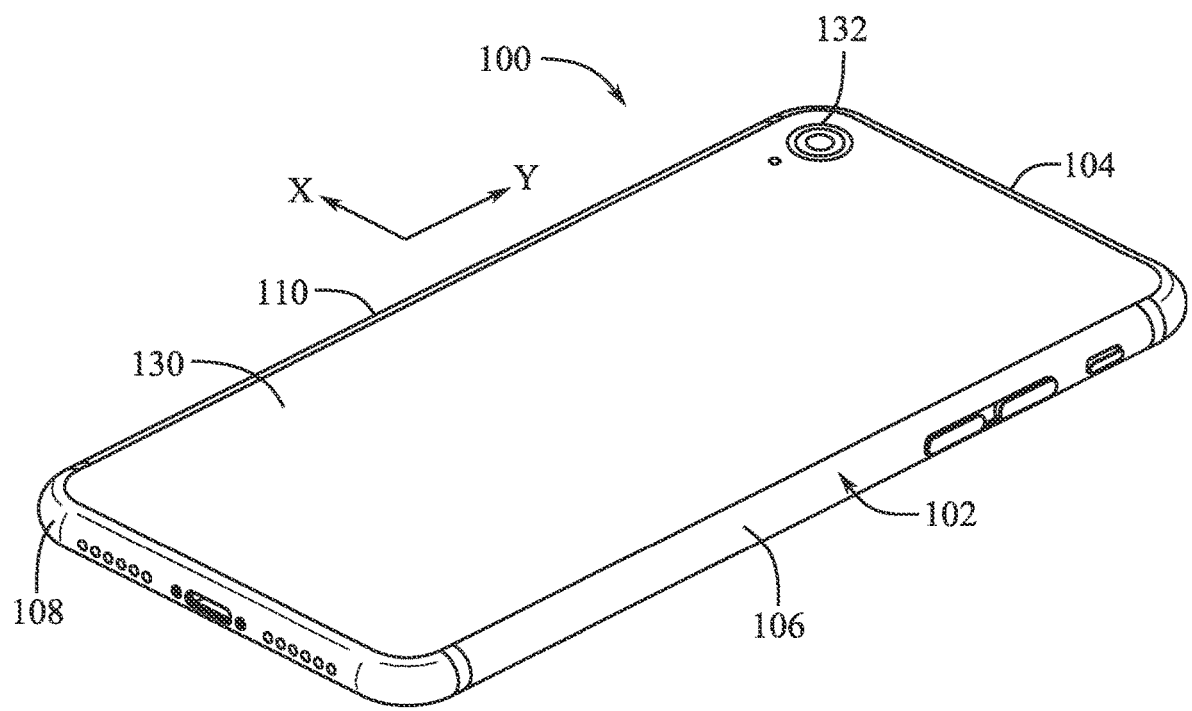
FIG. 2 shows a bottom perspective view of the electronic device of FIG. 1.

FIG. 2 shows a rear perspective view of the electronic device of FIG. 1. As can be seen, the device 100 can further include a back cover or back protective layer 130 that can cooperate with the band 102 and the protective cover 118 to further define the internal volume and exterior surface of the device 100. As noted above with reference to FIG. 1, the band 102 can include the first sidewall component 104, the second sidewall component 106, the third sidewall component 108, and the fourth sidewall component 110. The back cover 130 can be formed from any desired material, such as, metals, plastics, ceramics, or composites. In some examples, the back cover 130 can be formed from the same or a similar material as the protective cover 118. In some examples, the back cover 130 can be a conductive transparent material, such as indium titanium oxide or a conductive silica. In some examples, the back cover 130 can define an aperture or orifice that can receive a unitary optical component 132, as described further herein. The unitary optical component 132 of the device 100 shown in FIG. 2 can include any of the unitary optical components and various components thereof described herein. The unitary optical component 132 can cover or extend above one or more emitters and/or detectors, as will be described in more detail below with reference to other examples, in order to perform the functions associated with emitters and detectors discussed above.

Additionally, in some examples, the back cover 130 itself can include some or all of the features of the unitary optical components described herein. For example, the back cover 130 can include one or more transparent portions overlying an emitter and/or a detector, for example, as associated with a camera system, and can also include one or more opaque portions extending the thickness of the cover 130 and disposed between the transparent portions, as described herein.

Figure 3:
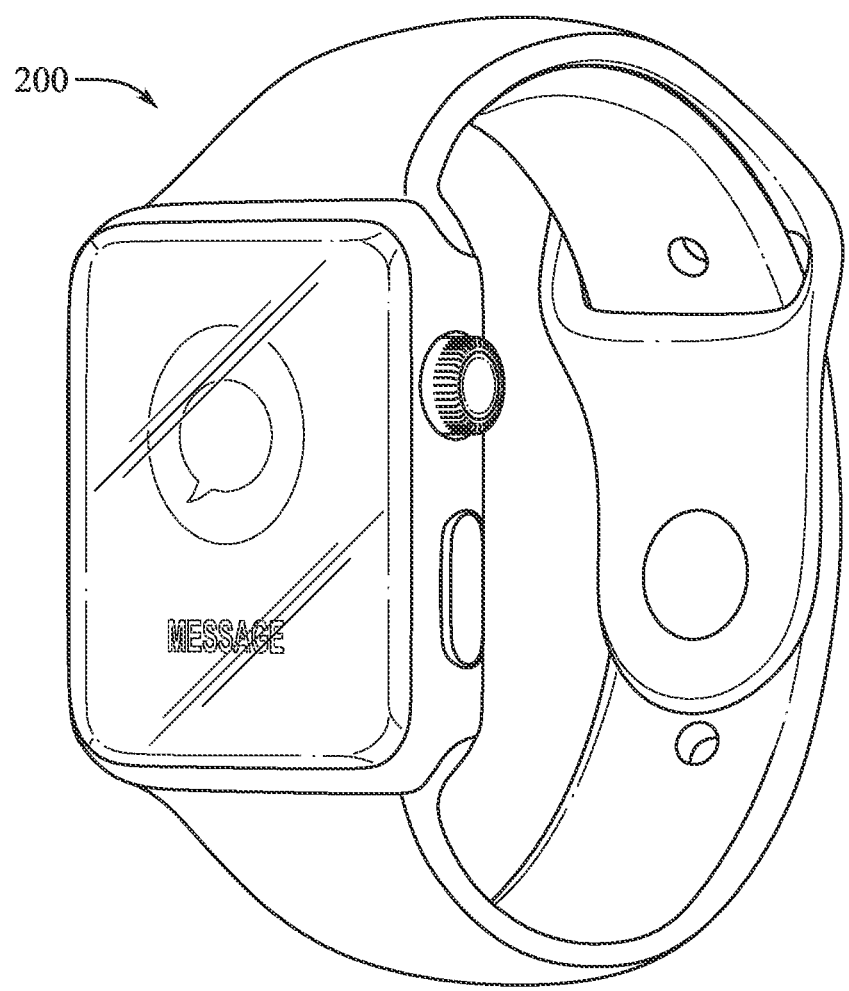
FIG. 3 shows a front perspective view of an example of an electronic device.

FIG. 3 shows front perspective view of an example of a wearable electronic device 200. The electronic device shown in FIG. 3 is a watch, such as a smartwatch. The smartwatch 200 of FIG. 3 is merely one representative example of a device that can be used in conjunction with the components and methods disclosed herein. The electronic device 200 can correspond to any form of wearable electronic device, a portable media player, a media storage device, a portable digital assistant ("PDA"), a tablet computer, a computer, a mobile communication device, a GPS unit, a remote control device, and other similar electronic devices. The electronic device 200 can be referred to as an electronic device, or a consumer device. In at least one example, the smartwatch 200 can include one or more emitters and detectors directed at the user's skin, for example the skin of the user's wrist against which the watch may be pressed during use, for determining a number of biometric or biological properties of the user's body, such as a user's pulse, heart activity, and/or other similar biometric properties.

Figure 4:
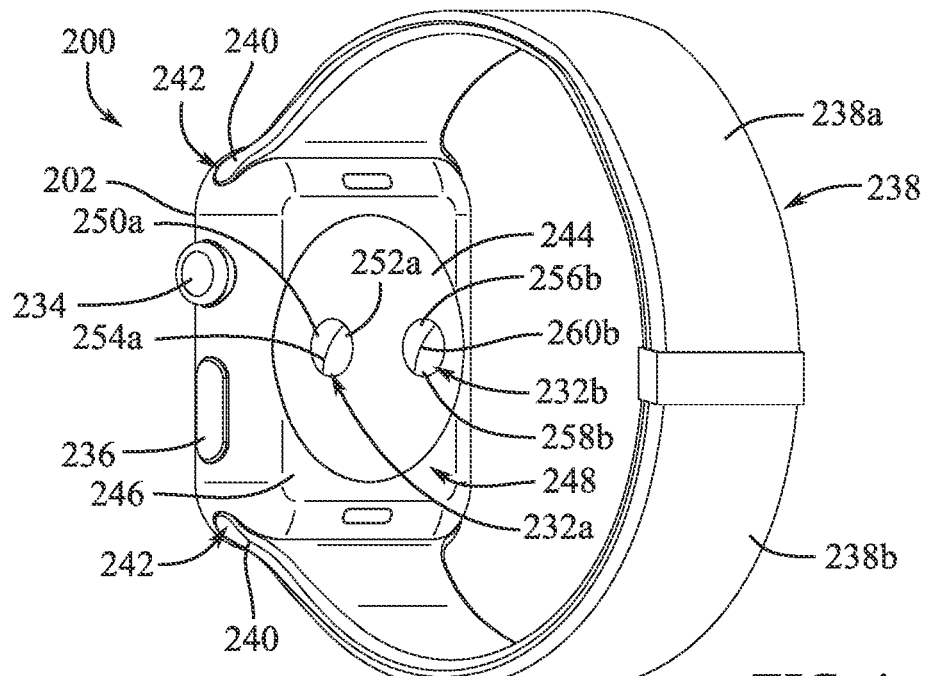
FIG. 4 shows a rear perspective view of the electronic device of FIG. 3.

FIG. 4 shows a rear perspective view of the device 200 shown in FIG. 3. In one example, the device 200 can include one or more light emitters and detectors/photosensors to monitor a user's physiological information. As shown in FIG. 4, the device 200 can have one or more emitter and/or detector windows or lenses, such as unitary optical components 232a, 232b with each component 232a, 232b having integrated, opaque, optical isolation features, as discussed in more detail below.

In one example, the device 200 includes a housing 202 that is attached to a display window and includes various input devices that, in the example depicted, can include a dial 234 and a button 236. The device 200 can be worn on a user's wrist and secured thereto by a securement band 238. The securement band 238 includes first and second band segments 238a, 238b, each of which is coupled to a lug 240 at one end of each band segment and that fits within a respective recess or aperture 242 of housing 202, allowing each band segment 238a, 238b to be removably attached to the device 200.

In the example illustrated in FIG. 4, the housing 202 can include a separate back cover 244 that is secured to a casing 246. The casing 246 can be made from a metal, ceramic, glass or plastic material and have openings configured to receive back cover 244. In examples that use inductive charging to recharge the device 200, back cover 244 can be made out of a ceramic, glass or plastic material, as described in more detail below, to provide a low resistance path for inductive charging. However, in examples that do not use inductive charging, back cover 244 can be made from any material, including a metal. In some examples, the device 200 may not have a separate back cover 244 and housing 202 can be a unitary structure with an opening to receive the optical components 232a, 232b. In examples without a back cover that use inductive charging, the housing 202 can be made from a ceramic, glass or plastic material. However in examples without a back cover that do not use inductive charging, the housing 202 can be made from any material including a metal.

First and second optical components 232a, 232b, respectively, that can also be referred to as inserts, are fit within openings formed in the housing 202 or the back cover 244 and are exposed on a bottom surface 248 of the housing. The openings extend from an interior surface of housing 202 to an exterior surface of the housing and therefore first and second optical components 232a, 232b, respectively, allow light to pass through the housing. As discussed above, in some examples, the housing 202 can include a back cover 244 and the openings can be formed in the back cover 244.

First and second optical components 232a, 232b, respectively, enable emitters and detectors (not shown in FIG. 4)

within housing 202 to monitor a user's physiological information such as blood oxygen content, $CO_2$ levels and heart rate by collecting information from the user's skin and/or underlying tissue. According to some examples of the disclosure, either or both of optical components 232a, 232b can include multiple distinct transparent regions separated by one or more opaque portions. For example, optical component 232a can include a first transparent region 250a that allows transmitted light from the respective emitter to impinge the user's skin and a second transparent region 252a that allows light reflected off the user's skin and/or underlying tissue to be received by the detector. A first opaque portion 254a can be disposed between first and second transparent regions, 250a, 252a, respectively, to isolate the transmitted light from the reflected light so the reflected light primarily comes from the user and not from within first optical component 250a.

Similarly, second optical component 232b can include two transparent regions 256b, 258b separated by a second opaque portion 260b. Second optical component 232b can be used in a similar fashion as first optical component 232a. In some examples first optical component 232a can be used for a first type of physiological sensor and second optical component 232b can be used for a different type of physiological sensor. For example, a first emitter/detector set can employ a first wavelength of light and window 232a can include transparent regions 250a, 252a that are transparent to the first wavelength. Similarly, a second emitter/detector set can employ a second wavelength of light different from that of the first set and window 232b can include transparent regions 256b, 258 that are transparent to the second wavelength. The emitter/detector sets, first and second optical components 232a, 232b, and the function of one particular type of emitter and/or detector will be discussed in more detail below.

The wearable electronic device 200 includes circuitry, sensors, one or more electronic assemblies, display and input devices (not all shown in FIG. 4) that enable it to perform a variety of functions including, but not limited to: keeping time; monitoring a user's physiological signals and providing health-related information based on those signals; communicating (in a wired or wireless fashion) with other electronic devices; providing alerts to a user, which can include audio, haptic, visual and/or other sensory output, any or all of which can be synchronized with one another; visually depicting data on a display; gathering data from one or more sensors that can be used to initiate, control, or modify operations of the device; determining a location of a touch on a surface of the device and/or an amount of force exerted on the device, and use either or both as input; accepting voice input to control one or more functions; accepting tactile input to control one or more functions; and so on.

Figure 5:
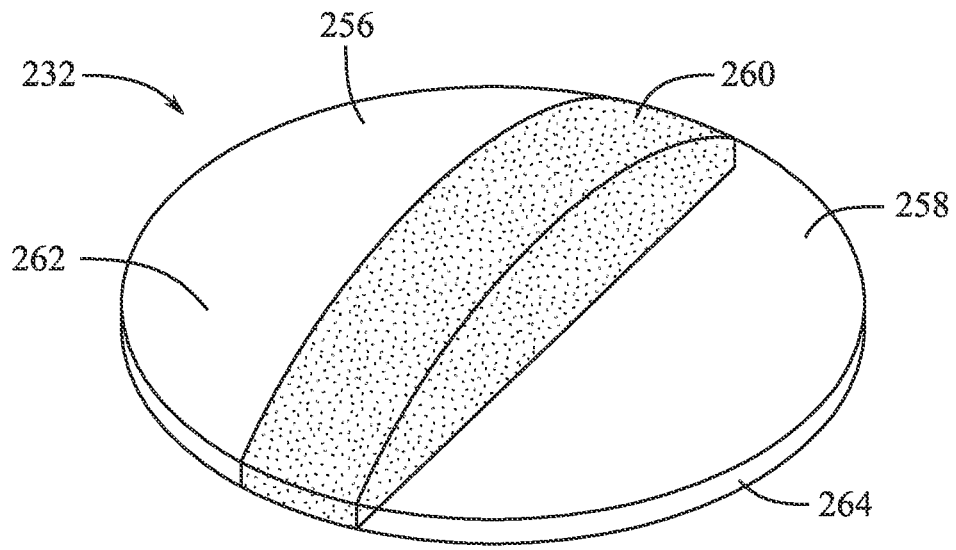
FIG. 5 shows a perspective view of an example of an optical component.

FIG. 5 illustrates a perspective view of an example of a unitary optical component, separate from any device with which the component may be integrated, which can be similar to the optical components 232a, 232b shown in FIG. 4. As shown in FIG. 5, optical component 232 can include an opaque portion 260 disposed between first and second transparent regions, 256, 258, respectively. In some examples, the exterior surface 262 of the optical component 232 can be contoured and shaped before assembling the component 232 into the back cover 244 (see FIG. 1B). In some examples, the exterior surface 262 can be flat, convex or any other shape. A convex shape can enable improved contact with the user's skin and can be more comfortable for the user than other shapes. A perimeter 264 of the unitary optical component 232 can be flat (e.g., not convex) to enable the window to be mounted within the back cover 244 and to facilitate polishing and finishing without creating sharp edges that are prone to fracture. The first opaque portion 260 can be disposed between the first and second transparent regions 256, 258 using myriad manufacturing methods, some of which are described in more detail below.

Any of the features, components, parts, including the arrangements and configurations thereof shown in FIGS. 3-5 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 3-5.

Figure 6:
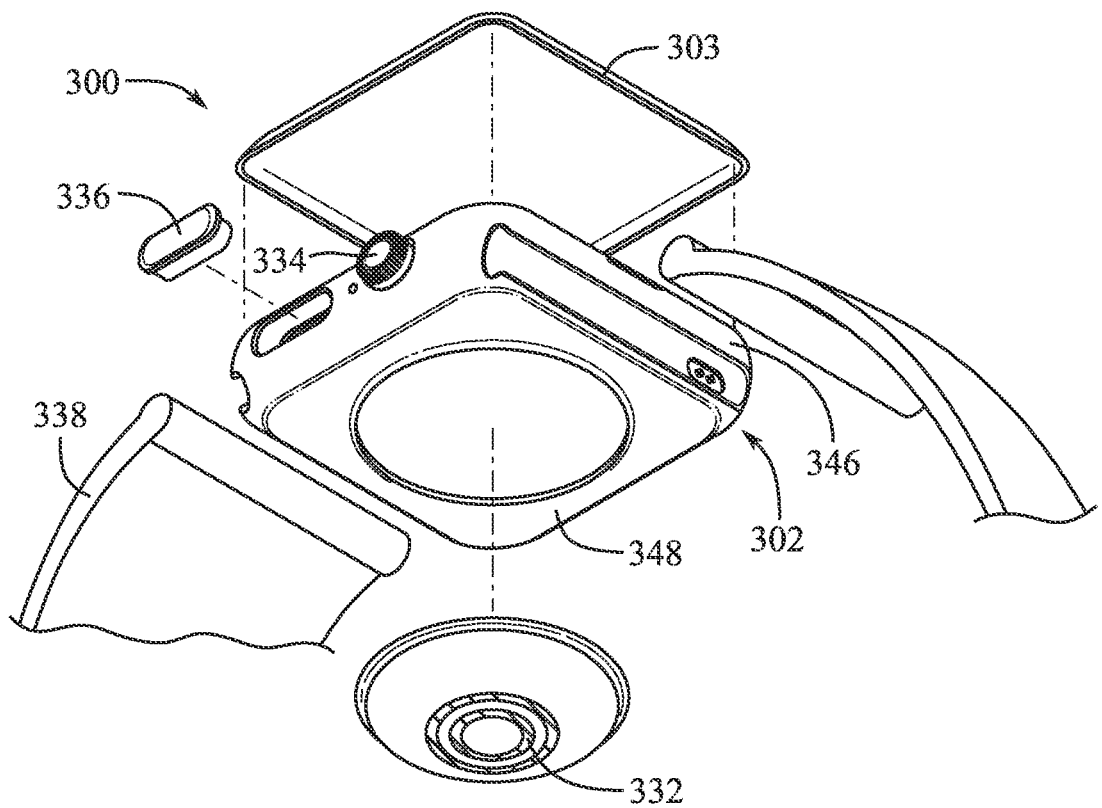
FIG. 6 shows a bottom exploded view of an example of an electronic device having an optical component.

Referring now to FIG. 6, an exploded view of another example of a wearable electronic device 300 is shown, which can include a housing 302 and a cover 303 attached to the housing 302. The housing 302 can substantially define at least a portion of an exterior surface of the device 300 and can include a casing 346 defining a bottom surface 348. The cover 303 can include glass, ceramic, plastic, or any other substantially transparent material, component, or assembly. The cover 303 can cover or otherwise overlay a display, a camera, a touch sensitive surface such as a touchscreen, or other component of the device 300. The cover 303 can define a front exterior surface of the device 300.

The back casing 348 can include ceramic, plastic, metal, or combinations thereof. In some examples, the casing 348 can include a unitary optical component 332, also referred to as an at least partially electromagnetically transparent component 332. The optical component 332 can include one or more portions that are transparent to any desired wavelength of electromagnetic radiation, such as visual light, infrared light, radio waves, or combinations thereof, with one or more opaque portions disposed between the electromagnetically transparent portions.

In some examples, the transparent portions of the unitary optical component 332 can be disposed over one or more electromagnetic radiation emitters and/or detectors, while the opaque portions can inhibit or prevent electromagnetic radiation emitted by an emitter from leaking to a detector along an undesirable pathway. Together, the housing 302, cover 303, and casing 348 can substantially define an interior volume and an exterior surface of the wearable electronic device 300.

The electronic device 300 can further include a securement band 338, or other component designed to attach the device 300 to a user or to otherwise provide wearable functionality. In some examples, the securement band 338 can be a flexible material that can comfortably allow the device 300 to be retained on a user's body at a desired location. The securement band 338 can be removably secured to the housing 302 in a similar manner as discussed with reference to the device 200 shown in FIG. 4.

Figure 7:
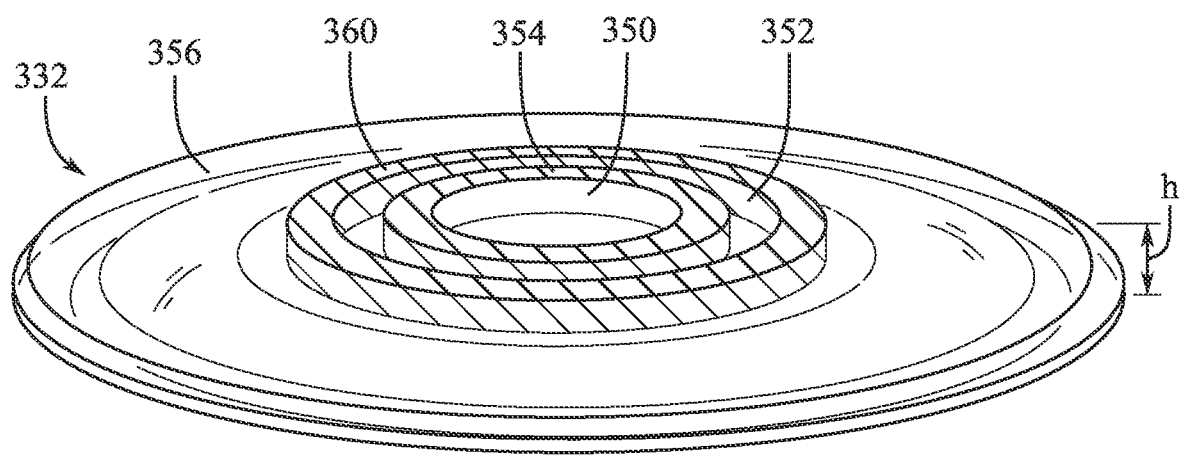
FIG. 7 shows a perspective view of an example of an optical component.

FIG. 7 shows a perspective view of an example of an optical component 332 of an electronic device, which can be similar to the optical component 332 disposed with the device 300 shown in the exploded view of FIG. 6. As can be seen in FIG. 7, the optical component 332 can include a first transparent portion 250, a second transparent portion 252, and a third transparent portion 256. In some examples, and as illustrated, the second transparent portion 252 can surround the first transparent portion 250 while the third transparent portion 256 can surround both the first and second transparent portions 250, 252. FIG. 7 illustrates just one particular exemplary arrangement of the transparent portions 250, 252, 256. The optical component 332 can include transparent portions in any number and configuration, as described further herein.

Continuing with FIG. 7, a first opaque portion 354 can be disposed between the first and second transparent portions 350, 352, and a second opaque portion 360 can be disposed between the second and third transparent portions 352, 356. In this example, the opaque portions 354, 360 can entirely surround the perimeter of the respective adjacent transparent portions 350, 352, although in some other examples, one or more opaque portions may not entirely surround a transparent portion. In some examples, the outer surfaces of the transparent portions 350, 352, 356 and the opaque portions 332, 334 can be level, flush, or in line with one another and can collectively define a surface of the optical component 332, and can at least partially define the exterior surface of an electronic device, such as device 300.

The term "flush" means to be approximately even or level at a surface or within generally the same plane or a smooth transition between surfaces of a curved surface such that no abrupt change in elevation or angle occurs from the surface of one component to the next. A "flush" surface can include two or more contiguous surfaces. In some examples, a flush surface can have an average surface roughness ($R_a$) of less than 10 microns, less than 5 microns, less than 1 micron, less than 0.75 microns, less than 0.5 microns, less than 0.25 microns, or less than 0.1 microns or smaller.

In some examples, the opaque portions 354, 360 can extend an entire thickness or height "h" of the optical component 332. In these examples, the opaque portions 354, 360 can prevent electromagnetic radiation, such as visible or infrared light, from being internally reflected in the optical component 332 from one transparent portion to another transparent portion.

The transparent portions 350, 352, 356, and the opaque portions 354, 360 can be formed from, or can include, substantially any material having the desired levels of transmissivity or opaqueness in any desired range of electromagnetic radiation. For example, the transparent portions 350, 352, 356 can be formed from, or can include, a material that is transparent to electromagnetic radiation in the visible light spectrum, to infrared light, to ultraviolet light, to radio waves, or to any other desired range of wavelengths of light. Further, the transparent portions 350, 352, 356 need not be completely transparent to the desired range or ranges of wavelengths of light. For example, the transparent portions 350, 352, 356 can be 90% transparent, 80% transparent, 70% transparent, 50% transparent, 25% transparent, or even lower for certain applications.

In some examples, one or more transparent portions 350, 352, 356 can be formed from, or can include, any desired material, such as ceramics or polymeric materials. In some examples, the one or more transparent portions 350, 352, 356 can include ceramic materials such as sapphire, glass, zirconia, spinel and/or other ceramic materials transparent to a desired range of wavelengths of light. Other materials can include quartz or aluminum oxynitride. In some examples, the one or more transparent portions 350, 352, 356 can be formed from polymeric materials, such as polycarbonate, acrylics, polyvinyl chloride, polyethylene terephthalate, and/or other polymeric materials transparent to a desired range of wavelengths of light. In some examples, one or more transparent portions 350, 352, 356 can include a ceramic material and one or more other transparent portions 350, 352, 356 can include a polymeric material.

The opaque portions 354, 360 can include or be formed from a metal material and at a sufficient thickness that renders the opaque portions 354, 360 opaque to a desired range of wavelengths of light, such as aluminum, titanium, silver, gold, copper, zirconium, or other metals. In some examples, one or more opaque portions 354, 360 can be formed from or can include any desired material, such as ceramics or polymeric materials.

The transparent portions 350, 352, 356 and the opaque portions 354, 360 can be joined directly together without any intermediate material layers such as adhesive layers, welding or bonding material layers, or the like, in order to form a substantially unitary body or optical component 332. The term "unitary" means to be an approximately singular or solid body. A "unitary" component can include two or more parts or portions that are joined, bonded, fused, or otherwise held together as a single component or piece.

For example, an opaque portion 360 can be joined to a transparent portion 356 by directly fusing the materials of each the portions 360, 356 together as described herein. Other methods for bonding, joining, or integrally forming one or more portions can be used in any desired combination. In some examples, a surface of the optical component 332, for example, the surface at least partially defining an exterior surface of an electronic device, can have a larger surface area of transparent material than opaque material. That is, the transparent portions 350, 352, 356 can define a larger surface area of the optical component 332 than the opaque portions 354, 360. In some other examples, however, the surface of the optical component 332 at least partially defining an exterior surface of an electronic device can have a larger surface area of opaque material than transparent material.

The optical component 332 can include any number of transparent portions 356 and opaque portions 360 separating transparent portions 360. The opaque portions 360 and transparent portions 356 of a single, unitary optical component 332 can be formed together and combined in any number of configurations to form optical boundaries and transparent areas of the optical component 332 having any shape and desired configuration to accommodate any positions of the emitters and detectors disposed within the device 300 and below the optical component 332. The unitary optical component 332 can include a flush exterior surface defined by the opaque and transparent portions 360, 356, and the opaque portion 360 can prevent or inhibit internally reflected light from passing between transparent portions 356 of the optical component 332.

In addition to the optical isolation functionality of the opaque portions described herein, including opaque portions 360 shown in FIG. 7, the opaque portions 360 can be formed using one or more heat-conductive materials, including the various metal materials described herein, such that the opaque portions 360 form isolated heat pathways through the optical component 332. For example, heat can be transferred through the optical component 332 via the opaque portions 360 while the less conductive ceramic transparent portions 350, 352, 356 act as insulators that limit or prevent the transfer of heat there through.

In this way, the heat conductive opaque portions can be positioned within the optical component 332 so as to maximize heat transfer from inside the device 300 to the outside or vice versa. In one example, the positon of one or more opaque portions 360 can correspond to a position of a heat generating internal component of the device 300. In one example, one or more opaque portions 360 can contact the heat generating component or otherwise be connected to that component via a heat transfer pathway. As such, heat can be transferred from the heat generating component out of the device via the opaque portion 360.

Similarly, in some examples, the opaque portions 360 can be electrically conductive such that each opaque portion 360 can be a part of an electrical circuit or form an electrical signal pass-through feature. In such examples, the opaque portions 360 can transmit electrical signals through the optical component. In one example, the electrically conductive opaque portions 360 can form one or more electrodes serving as part of a capacitive touch layer of a capacitive sensor.

Any number or variety of electronic device components can include two or more transparent portions and at least one opaque portion disposed there between, as described herein. The process for forming such a unitary component can include any combination of joining, bonding, co-forming, or fusing the portions together, as described herein. The unitary component can include a flush external surface defined by the opaque and transparent components, and the opaque portion(s) can prevent or inhibit internally reflected light from passing between transparent portions of the component. Various other examples of unitary optical components including opaque and transparent portions as described herein, and processes for forming the same, are further described below with reference to FIGS. 8A-15.

Any of the features, components, parts, including the arrangements and configurations thereof shown in FIGS. 6-7 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 6-7.

Figure 8A:
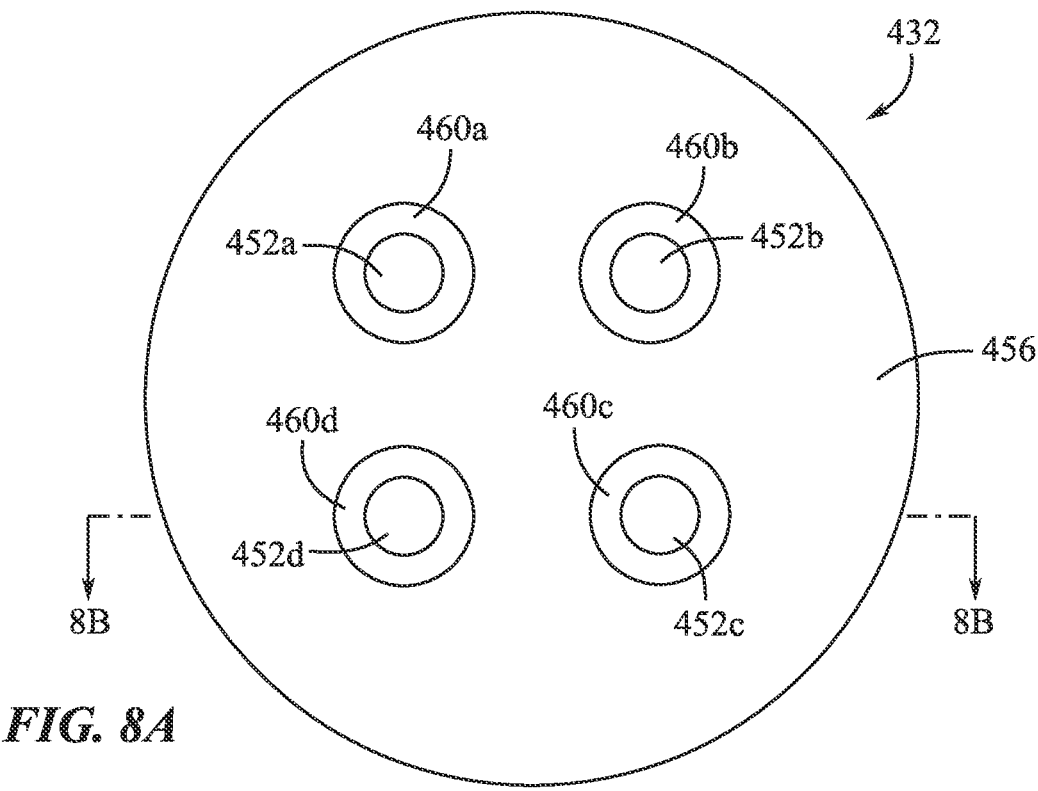
FIG. 8A shows a top view of an example of an optical component.

Along these lines, FIG. 8A illustrates a top view of an example of a unitary optical component 432 that includes transparent portions 452a, 452b, 452c, and 452d (collectively referred to as "transparent portions 452" or "individual transparent portions 452") separated from transparent portion 456 by respective opaque portions 460a, 460b, 460c, and 460d (collectively referred to as "opaque portions 460" or "individual opaque portions 460"). As shown, a number or ring shaped or circular opaque portions 460 can be positioned within or across a thickness of the optical component 432 such that light transmitted through transparent portions 452 does not cross opaque portions 460 into transparent portion 456. The example shown in FIG. 8A includes four opaque portions 460 spaced equally and radially around at a certain radius from the center of the optical component 456. It will be understood, as noted above, that the number, size, position, and orientation of each opaque portion 460 can vary in one or more other examples.

Figure 8B:
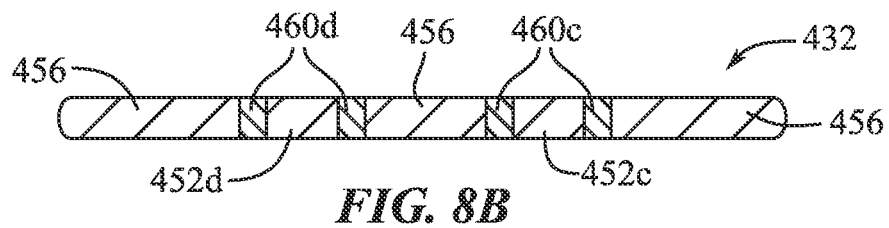
FIG. 8B shows a cross-sectional view of the optical component of FIG. 8A.

FIG. 8B illustrates a cross-sectional view of the optical component 432 shown in the plane 8A indicated in FIG. 8A. As show, the opaque portions 460 extend through an entire thickness of the optical component 432 such that opposing surfaces of the optical component, for example upper and lower surfaces thereof, are defined by upper and lower surfaces of the opaque portions 460 and the transparent portions 452, 546. As noted above with reference to one or more other examples, the opaque portions 460 and transparent portions 452, 456 cooperate to form flush, smooth, even surfaces of the optical component 432 as a single, unitary component.

In at least one example, the opaque portions 460 and transparent portions 452, 456 are bonded directly to one another, as shown in FIG. 8B, without intermediate material layers such as adhesive layers or other layers disposed there between. That is, the metal material or materials of the opaque portions 460 are bonded directly to the transparent portions 452, 456 via direct chemical bonds between the material of the opaque portions 460 and the material of the transparent portions 452, 456. In this way, the transmission of light through the transparent portions 452, 456 is maximized because the opaque metal barriers or portions 460 are highly reflective metal material and absorption of light is minimized within the opaque portions 460.

Any of the features, components, parts, including the arrangements and configurations thereof shown in FIGS. 8A-8B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 8A-8B.

Figure 9:
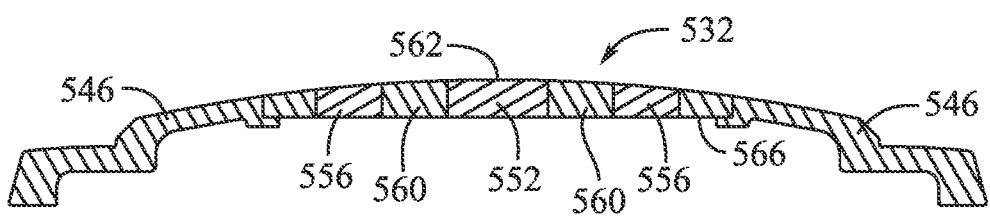
FIG. 9 shows a cross-sectional view of an example of an optical component.

FIG. 9 illustrates a cross-sectional view of another example of a unitary optical component 532 or lens disposed within an aperture of a casing 546. The optical component 532 includes opaque regions 560 separating transparent portions 552, 556 forming metal optical barrier extending through a thickness of the optical component 532, from a first surface of the optical component 532 or lens to a second surface opposite the first surface. As shown in the example of FIG. 9, the thickness of the optical component 532 can vary. The optical component 532, including the opaque and transparent portions 560, 552, 556 thereof, defines a curved exterior surface 562 and a flat interior surface 566, with the exterior surface 562 configured to press against the skin of the user wearing the device of which the casing 546 and optical component 532 are a part.

In one or more other examples, the interior surface 566 and the exterior surface 562 can be flat or curved at any desired curvature. Each surface 562, 566 can be flush and smooth with contiguous boundaries between the opaque and transparent portions 552, 556 as shown. Also, in at least one example, the optical component 532 can include transparent portions 552, 556 formed of sapphire and opaque portions 560 formed of a metal such as aluminum or titanium. The opaque portions 560 can be directly bonded to the transparent portions 552, 556. In this way, the opaque portions 560 form opaque metal barriers between the sapphire transparent portions 552, 556. In this way, in at least one example, the exterior surface 562 can be defined by an outer surface of each of the transparent portions 552, 556 and an outer surface of the opaque metal barrier/portion 560 which together form a continuous, flush, uninterrupted, and contiguous exterior surface 562. The same is true of the inner surfaces of each portion 560, 552, 556 forming a continuous, flush, uninterrupted, and contiguous interior surface 566 opposite the exterior surface 562 as shown.

Any of the features, components, parts, including the arrangements and configurations thereof shown in FIG. 9 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 9.

Figure 10:
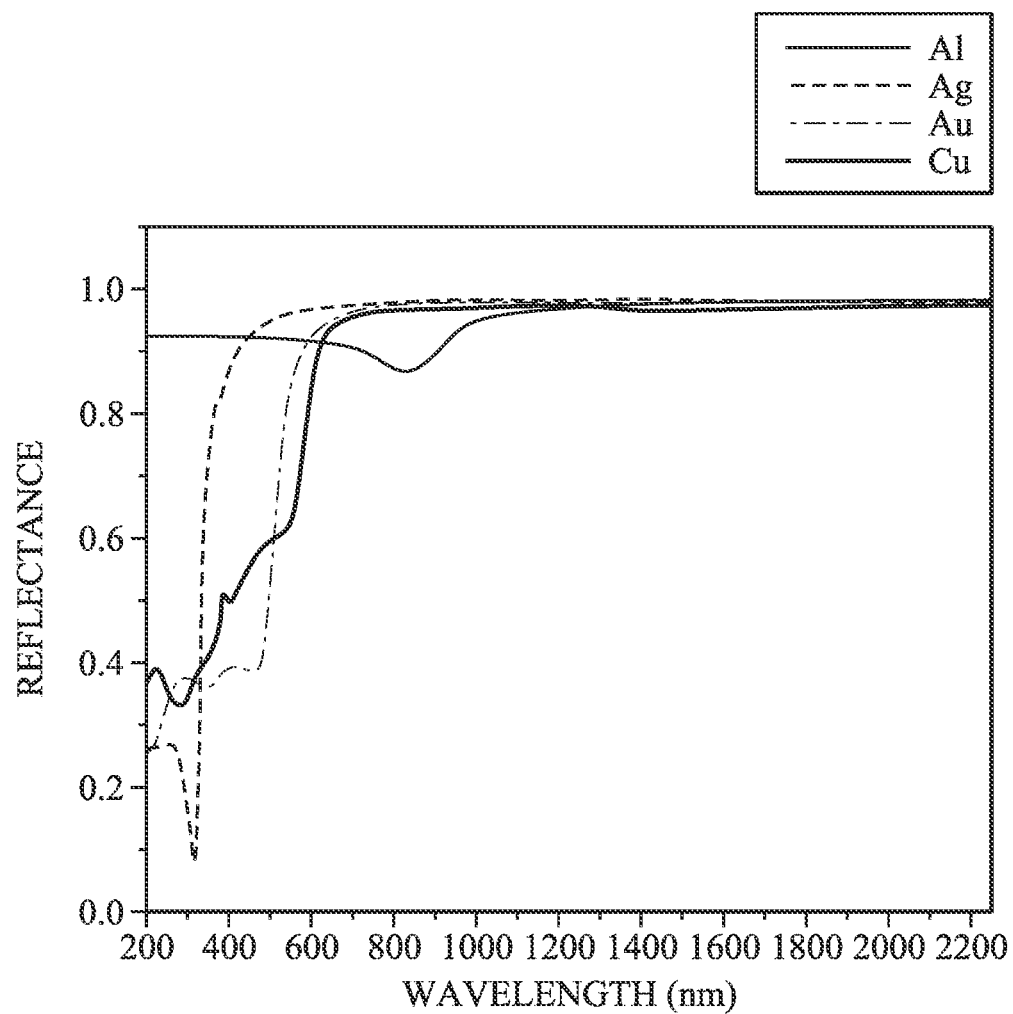
FIG. 10 shows a plot of reflectance vs. wavelength for various metals.

As noted above, various examples of optical components disclosed herein can include opaque portions, otherwise referred to as optical isolators or opaque barriers that include reflective metal materials. The metal of the opaque portions can include one or more aluminum, titanium, gold, silver, copper, or other suitable metals. These and other metals are highly reflective for many wavelengths and ranges of wavelengths as shown in FIG. 10, making them good candidates for forming the metal isolators/barriers described herein to achieve the advantages of maximizing light transmission through adjacent transparent portions of a lens. As shown in the plot of FIG. 10, Silver (Ag), gold (Au), Copper (Cu), and Aluminum (Al) exhibit near total reflectivity at or above about 1000 nm wavelengths. Other metals such as titanium and others exhibit similar reflective properties, making titanium a good candidate for forming the opaque optical barriers/portions described herein.

In addition, these and other metals do not significantly absorb light in these similar wavelengths, including wavelengths suitable for the biometric and other sensing functionalities of emitters and detectors in wearable electronic devices discussed above. Thus, when light travels through the transparent portions of the optical lenses/components described herein, some of that light may impinge on adjacent opaque portions of the lens. These opaque regions formed of one or more metals described herein and/or discussed with reference to FIG. 10, will not absorb the light but rather reflect the light such that the light continues travelling through the transparent portions. Because the opaque portions of the optical components described herein are bonded directly to the transparent portions, no other intermediate layers or materials are present to absorb the light or reduce reflectivity of the opaque portions.

Figure 11:
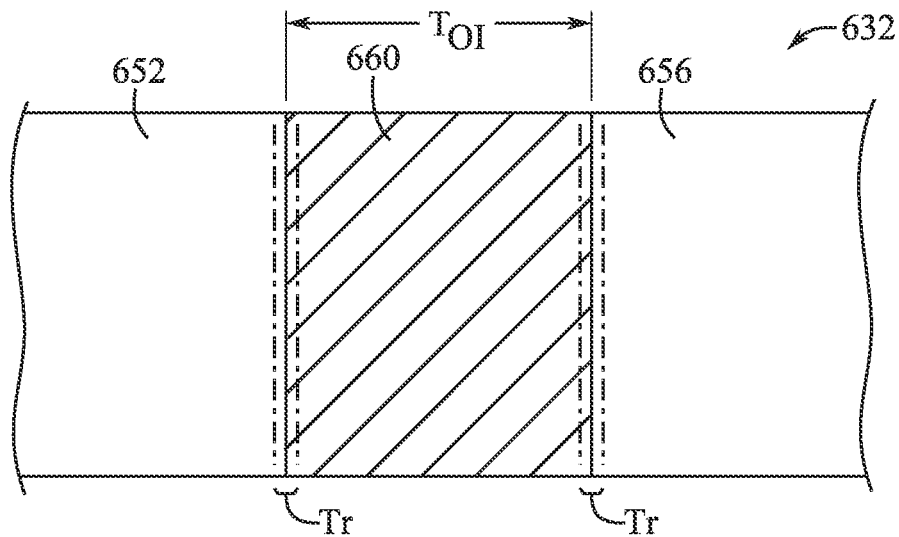
FIG. 11 shows a close-up cross-sectional view of an example of an optical component.

FIG. 11 shows a close-up, cross-sectional view of an optical lens 632 that can be similar to other unitary optical component described herein. In the illustrated example of the lens 632, an opaque metal barrier or metallic optical isolator 660, which can be similar to other opaque portions described herein, separates two transparent substrates 652 and 656, which can be similar to other transparent portions described herein.

The optical isolator 660 is bonded directly to adjacent transparent substrates 652, 656. In one example, the transparent substrates 652, 656 includes sapphire and the optical isolator includes aluminum. During formation, the bonding interface, or boundaries between the optical isolator 660 and adjacent transparent substrates 652, 656, can form a transition zone Tr, indicated on each side of the optical isolator 660 in FIG. 11. In at least one example, the transition zone Tr defines a boundary having a thickness, the boundary disposed between the optical isolator 660 and adjacent transparent substrates 652, 656. The boundary or transition zone Tr can include a thickness of the optical lens 632, from a transparent substrate 652, 656 to the optical isolator 660, where the material of the optical isolator 660 is forms material/chemical bonds with adjacent material of the transparent portions 652, 656. In at least one example, the optical isolator 660 includes a first transition zone Tr between the optical isolator 660 and a first transparent substrate 652 and the optical isolator 660 includes a second transition zone Tr between the optical isolator 660 and a second transparent substrate 656. In at least one example, the transition zones Tr can be a part of the optical isolator 660 such that when a thickness of the transition zone Tr is described, the thickness thereof can include the thicknesses of the transition zones Tr. In such an example, the optical isolator can include the transition zones Tr.

Figure 12:
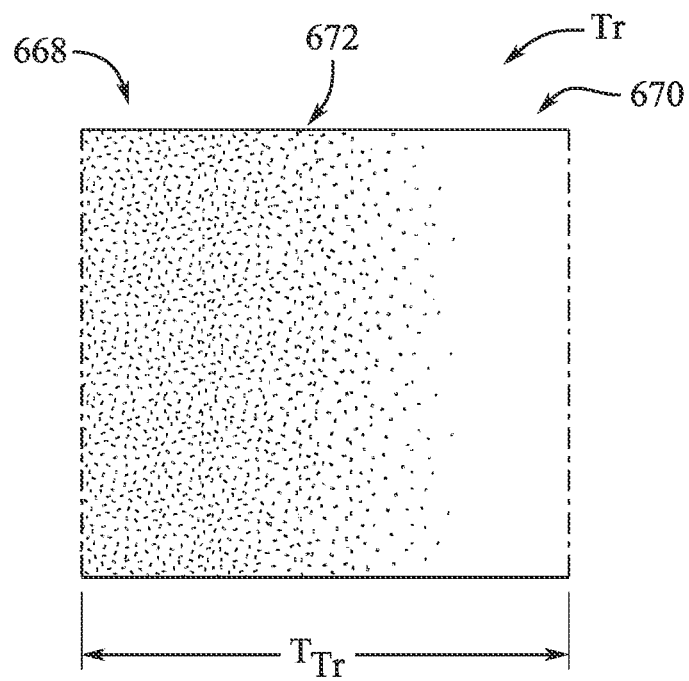
FIG. 12 shows a close-up cross-sectional view of an example of an optical component.

FIG. 12 shows a close-up view of one of the transition zones Tr shown in FIG. 11 to illustrate the bonded materials between the optical isolator 660 and the adjacent transparent substrate 656. As shown, at a first end 668 or boundary of the transition zone Tr nearest the metallic optical isolator 660, the transition zone Tr constitutes most if not all of the metal material of the optical isolator 660. Conversely, at a second end 670 or boundary of the transition zone Tr nearest the material of the transparent substrate 656, the transition zone Tr of the optical lens 632 include most if not completely the material of the transparent substrate 656. In the illustrated example, the material of the optical isolator 660 can be aluminum and the material of the transparent substrate 656 can be sapphire.

Between the first and second ends 668, 670 of the transition zone Tr, a middle portion or thickness 672 of the transition zone Tr can include a mixture or gradient of aluminum and sapphire material from the optical isolator 660 and transparent substrate 656, respectively. In addition, the middle portion or thickness 672 of the transition zone Tr can include material/chemical bonds, including aluminum-oxide (Al—O) bonds that secure the optical isolator 660 to the adjacent transparent substrate 656. In this way, the optical isolator 660 (opaque metal barrier/portion) is bonded directly to the first transparent substrate/portion 652 and the second transparent portion/substrate 656 via aluminum-oxide (Al—O) bonds. In one example, the Tr can include an amorphous structures or bonds (such as non-crystalline solids wherein the atoms and molecules are not organized in a definite lattice pattern) in the transition zone Tr. In another example, the transition zone Tr can include crystalline structures or bonds in the transition zone Tr.

The Al—O bonds of the transition zone Tr form sufficiently strong bonds to prevent breaking the unitary optical lens 632 at the boundaries between the optical isolator 660 and adjacent transparent substrates 652, 656. In at least one example, the optical lens 632, including transition zones Tr and boundaries between various opaque and transparent portions of the lens 632, including the bonds between the optical isolator 660 and adjacent transparent substrates 652, 6556 can have at least about a 2 bar resistance or about a 5 bar resistance, the resistance including shear resistance or "push-out" resistance at the transition zone Tr boundaries between the optical isolator 660 and adjacent transparent substrates 652, 656 described above. In some examples, the shear strength includes a resistance of at least 7.5 bars or at least 10 bars. In at least one example, the aluminum material of the optical isolator 660 can include a 5XXX series aluminum containing magnesium, which can improve bonding strength. In this way, the Al—O bonds of the transition zone Tr form the optical lens 632 into a single, strong, unitary component.

The thickness Tor of the optical isolators described herein, including the optical isolator 660 shown in FIG. 11, is sufficiently thick to be fully opaque and allow for at least twice the thickness TTr of the transition zones Tr on either side of the optical isolator 660 to encourage full bonding with adjacent materials of the transparent substrates 652, 656. Thus, in at least one example, a thickness TTr of the transition zone Tr can be at least about 50 nm. In some examples, the thickness TTr of the transition zone Tr can be between about 50 nm and about 100 nm. In yet other examples, the thickness TTr can be greater than about 100 nm, for example between about 100 nm and about 200 nm.

The thickness Tor of the optical isolator 660 is therefore at least twice the thickness of the thickness TTr of the transition zone Tr. Thus, corresponding examples of the thickness Tor of the optical isolator 660 can be at least about 100 nm, between about 100 nm and about 200 nm, or greater than about 200 nm, for example between about 200 nm and about 400 nm.

In addition, the thickness $T_{IO}$ of the optical isolator 660, as well as other opaque portions and barriers described herein, may be determined by the manufacturing processes used to form grooves or spaces within the transparent substrates 652, 656, including other transparent portions of other optical components and lenses described herein. For example, a single piece of transparent substrate can have grooves cut therein by chemically etching, laser cutting, or CNC machining. The grooves may be formed only part way through a thickness of the substrate such that metal material of the opaque portions can be inserted, melted, bonded, or otherwise formed within the grooves. Further steps for forming the various examples of optical components/lenses described herein will be described in more detail below with reference to FIGS. 13-15. However, based on the various manufacturing methods, the thickness $T_{IO}$ of the optical isolators and opaque barriers/portions described herein can be less than about 200 µm or less than about 100 µm, for example between about 200 nm and about 100 µm. In some examples, the thickness $T_{IO}$ of the optical isolators and opaque barriers/portions described herein can be less than about 200 nm, for example less than 100 nm or between about 50 nm and 100 nm.

Any of the features, components, parts, including the arrangements and configurations thereof shown in FIGS. 11-12 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 11-12.

Figure 13:
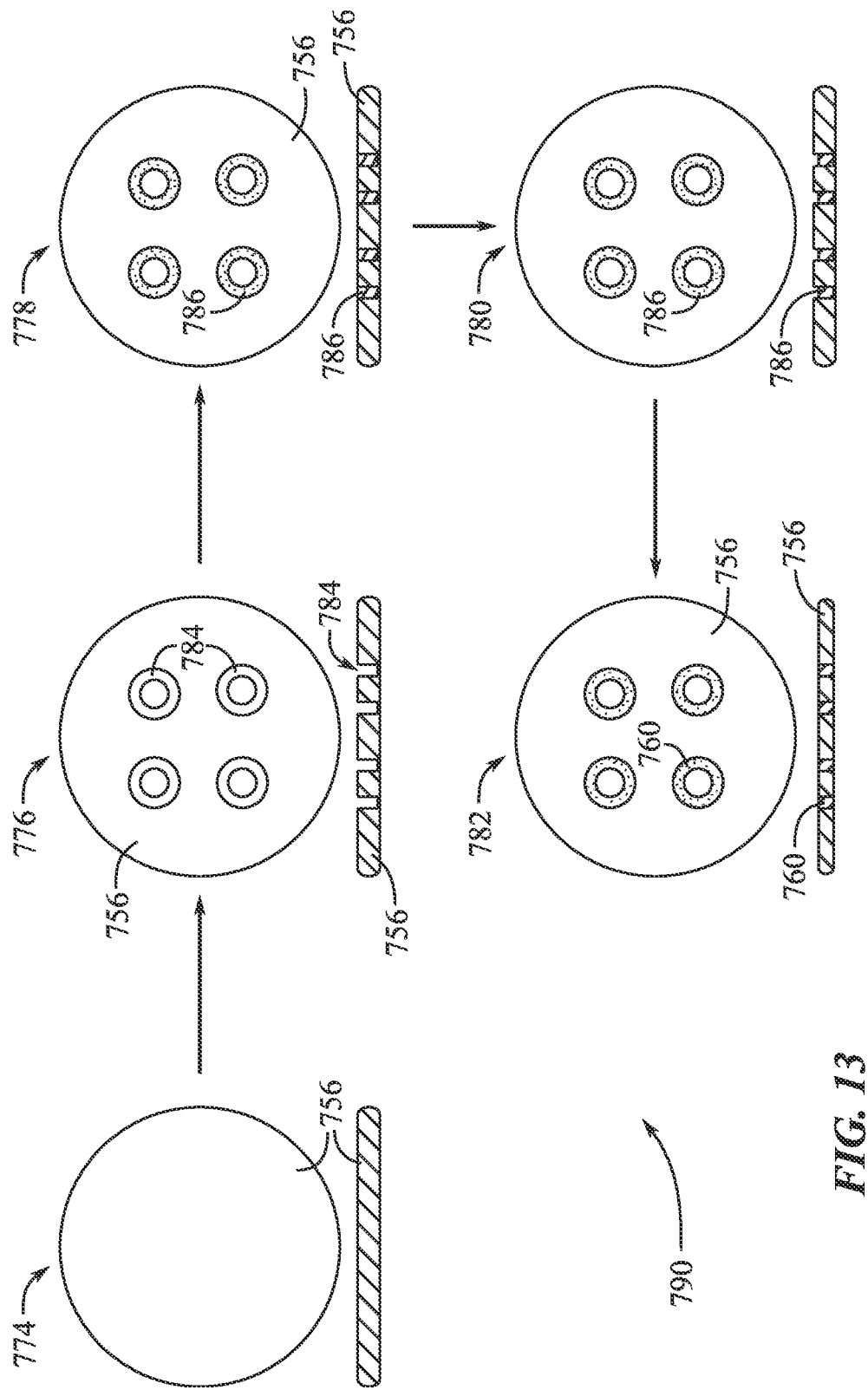
FIG. 13 shows an example of a method of forming an example of an optical component.

One example of a method 790 of forming the various examples of optical components described herein is shown in FIG. 13, with each step showing a top view of a component and an associated cross-sectional view thereof directly below the top view. In at least one example, a method 790 of forming an optical component includes a step 774 of providing a transparent material 756. Another step 776 can include forming grooves 784 in the transparent material 756 only partially through a thickness of the transparent material 756. The grooves can be laser cut, chemically etched, machined, or otherwise formed in the transparent material 756, as noted above. Another step 778 can include filling the grooves 784 with metal material 786, either in powder form, metal beads, metal wires, or other pieces of metal material or materials described herein. Another step 780 can include melting the metal material 786 within the grooves 784 such that bonding occurs between the metal material 786 and the sidewalls of the grooves 784. Once the metal material 786 has bonded to the transparent material 756 within the grooves 784, another step 782 can include a grinding, lapping, and/or polishing process to form flush, even surfaces on either side of the optical component and to expose the opaque portions 756 to be flush with the outer surfaces along with the outer surfaces of the transparent portions 756.

Figure 14A:
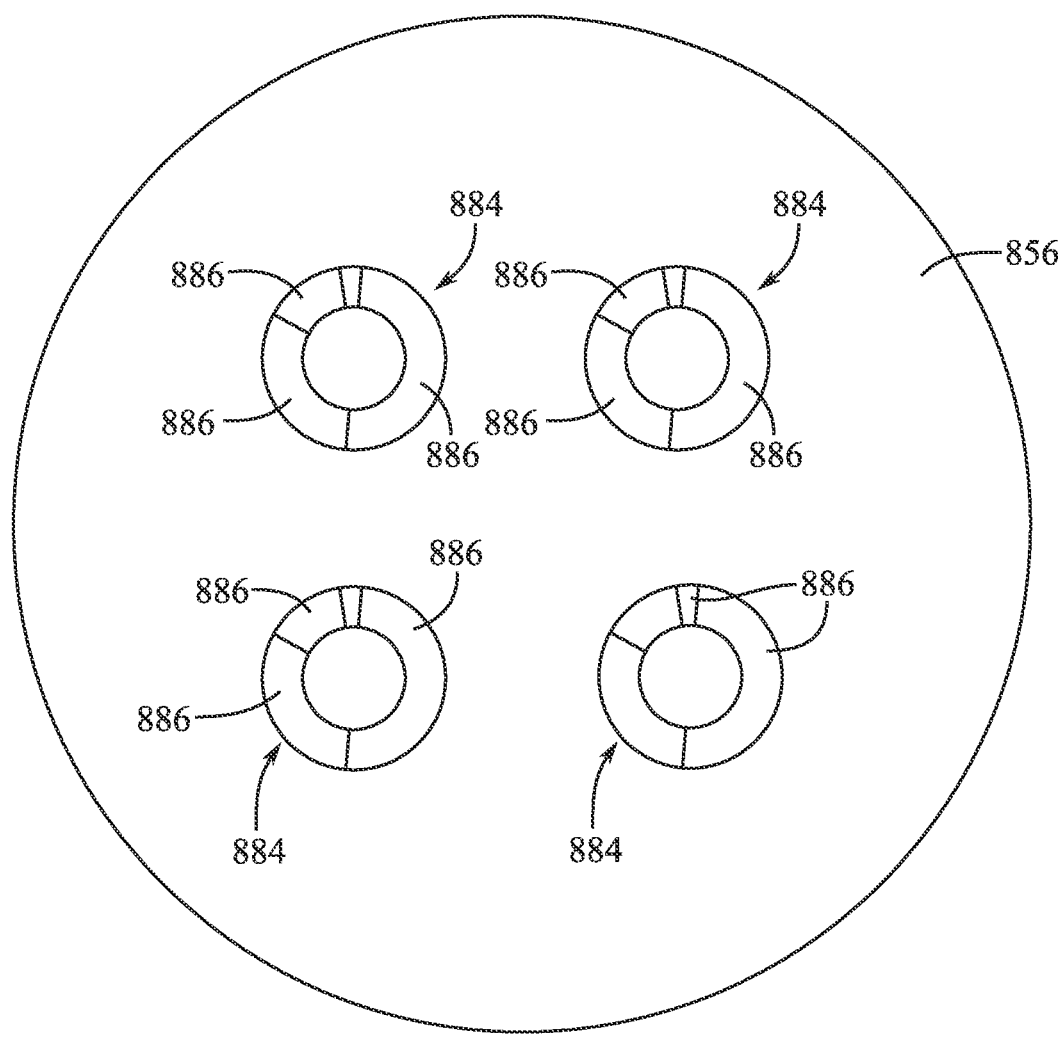
FIG. 14A shows a top view of an example of an optical component during a manufacturing step thereof.
Figure 14B:
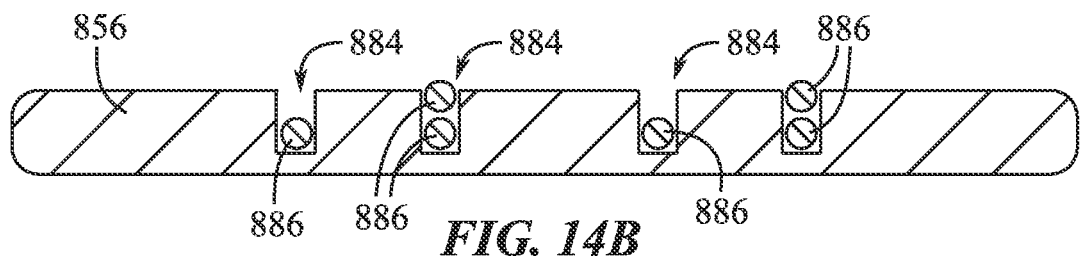
FIG. 14B shows a cross-sectional view of the optical component of FIG. 14A.

FIGS. 14A and 14B illustrate top and cross-sectional views, respectively, of an example of the step 778 shown in FIG. 13 of forming a unitary optical component or lens as described herein. In the example shown in FIGS. 14A and 14B, one or more tubular or otherwise shaped wires 886 of metal can be placed into the various grooves 884 of the transparent material 856 in preparation for melting and bonding the metal material to the transparent material 856 within the grooves 884. In at least one example, where the wires 886 include AWG 19 gauge aluminum wires, the top wire can be longer than the bottom wire about 9 mm in length and the bottom wire can be about 7 mm in length.

Any of the features, components, parts, including the arrangements and configurations thereof shown in FIGS. 14A-14B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 14A-14B.

Figure 15:
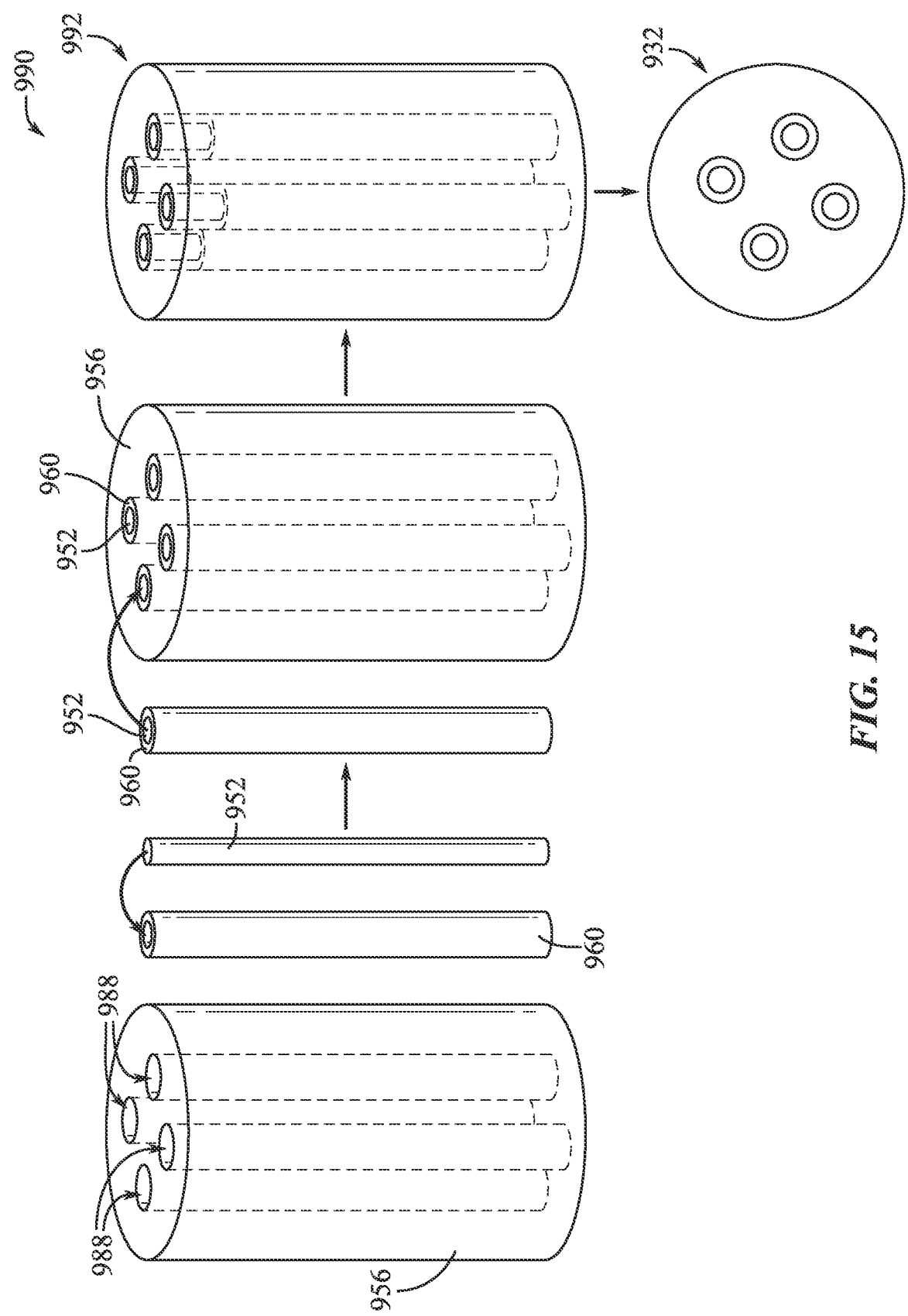
FIG. 15 shows an example of a method of forming an example of an optical component.

FIG. 15 illustrates another example of a method 990 of forming one or more unitary optical components, including the various examples thereof described herein. In at least one example of the method 990, a step includes drilling holes 988 through a cylindrical or otherwise shaped elongate portion of transparent material 956. Another step of the method 990 can include extruding metal material to form a tube 960 with an outer diameter that corresponds to an inner diameter of the holes 988 in the transparent material 956. Another step can include forming rods 952 of transparent material with outside diameters corresponding to the inside diameters of the metal tubes 960. The combined rod 952 and tube 960 can then be placed into the holes 988 in another step. A melting step 992 can then be performed to bond the metal tubes 960 to adjacent transparent material portions 956, 952 to form a single, unitary body. Another step can include cutting or slicing transversely across the unitary body to form a unitary optical component 932 similar to other examples of optical components/lenses described herein.

Any of the features, components, parts, including the arrangements and configurations thereof shown in FIG. 15 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 15.

Any of the features or aspects of the components discussed herein can be combined or included in any varied combination. For example, the design and shape of the unitary optical component is not limited in any way and can be formed by any number of processes, including those discussed herein. A component including one or more transparent portions and one or more opaque portions, as discussed herein, can be or can form all or a portion of a component, such as a housing or enclosure, for an electronic device. The component can also be or form any number of additional components of an electronic device, including internal components, external components, cases, surfaces, or partial surfaces.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific examples and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described examples. However, it will be apparent to one skilled in the art that the specific details are not required in order to practice the described examples.

Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. An optical lens, comprising:
a first transparent portion;
a second transparent portion;
an opaque metal barrier separating the first transparent portion from the second transparent portion; and
a transition zone between the opaque metal barrier and the first transparent portion;
wherein;
the opaque metal barrier is bonded directly to the first transparent portion and the second transparent portion via aluminum-oxide (Al—O) bonds; and
the transition zone comprises the Al—O bonds.

2. The optical lens of claim 1, wherein:
the optical lens defines a first surface, and a second surface opposite the first surface; and
the opaque metal barrier extends from the first surface to the second surface.

3. The optical lens of claim 2, wherein:
the first surface is defined by an outer surface of the first transparent portion, an outer surface of the second transparent portion, and an outer surface of the opaque metal barrier; and
the outer surfaces of the first and second transparent portions being flush with the outer surface of the opaque metal barrier.

4. The optical lens of claim 1, wherein a thickness of the opaque metal barrier is between about 200 nm and about 100 μm.

5. The optical lens of claim 1, wherein the opaque metal barrier comprises aluminum.

6. The optical lens of claim 5, wherein the first transparent portion and the second transparent portion comprise a ceramic.

7. The optical lens of claim 6, wherein the first transparent portion and the second transparent portion comprise sapphire.

8. The optical lens of claim 7, wherein a thickness of the transition zone is at least about 50 nm.

9. The optical lens of claim 7, wherein a thickness of the transition zone is at least about 100 nm.

10. The optical lens of claim 7, wherein a thickness of the opaque metal barrier is at least twice a thickness of the transition zone.

11. An optical component, comprising:
a metal optical isolator bonded directly to a ceramic transparent substrate; and
a transition zone extending between the optical isolator and the ceramic transparent substrate.

12. The optical component of claim 11, wherein a thickness of the transition zone thickness is between about 50 nm and about 200 nm.

13. The optical component of claim 12, wherein a thickness of the transition zone comprises an amorphous structure.

14. The optical component of claim 12, wherein a thickness of the transition zone comprises a crystalline structure.

15. An optical lens disposed within an aperture of an electronic device, the optical lens comprising:
a first transparent portion;
a second transparent portion;
an opaque metal portion disposed between and bonded directly to the first transparent portion and the second transparent portion; and
a transition zone between the opaque metal portion and the first transparent portion;
wherein:
a thickness of the opaque metal portion is less than about 200 μm; and
the transition zone comprises aluminum oxide (Al—O) bonds.

16. The optical lens of claim 15, wherein the thickness is less than about 100 μm.

17. The optical lens of claim 15, wherein the thickness is between about 50 μm and about 100 μm.

18. The optical lens of claim 15, further comprising an amorphous transition zone between the opaque metal portion and the first transparent portion, the transition zone including Al—O bonds.

19. The optical lens of claim 15, further comprising a crystalline transition zone between the opaque metal portion and the first transparent portion, the transition zone including Al—O bonds.

* * * * *